United States Patent [19]

Firestone

[11] 3,994,453

[45] Nov. 30, 1976

[54] METHOD AND APPARATUS FOR THE SAFE AND BEAUTIFUL SOLO FLIGHT OF SIDE-BY-SIDE DUAL-CONTROL AIRCRAFT FROM CENTERPLANE SEAT

[76] Inventor: Floyd A. Firestone, 172 Clinton Ave., Dobbs Ferry, N.Y. 10522

[22] Filed: June 4, 1973

[21] Appl. No.: 366,715

[52] U.S. Cl. .................... 244/118 P; 244/122 R
[51] Int. Cl.² .................................. B64D 11/06
[58] Field of Search .............. 244/122 R, 118 P, 84; 296/63, 64, 65; 297/232, 233, 239, 248, 250, 251, 252, 253

[56] References Cited
UNITED STATES PATENTS

| | | |
|---|---|---|
| 2,493,806 | 1/1950 | Dumas .............................. 297/250 |
| 2,538,427 | 1/1951 | Rogers et al. .................... 244/122 R |
| 2,664,140 | 12/1953 | Kindelberger ............... 244/122 R X |
| 2,839,312 | 6/1958 | Barenyi et al. .................... 296/64 X |
| 3,107,942 | 10/1963 | Rivkin ............................... 296/64 X |
| 3,207,552 | 9/1965 | Loughney ....................... 297/250 X |
| 3,638,997 | 2/1972 | Shapiro .......................... 297/248 X |
| 3,643,899 | 2/1972 | Firestone ........................ 244/118 P |
| 3,707,008 | 12/1972 | Fellin et al. ..................... 297/250 X |

Primary Examiner—Trygve M. Blix
Assistant Examiner—Galen L. Barefoot
Attorney, Agent, or Firm—Teare, Teare & Sammon

[57] ABSTRACT

To enable a single pilot to make a safe and beautiful SOLO flight of a side-by-side dual-control airplane, the pilot is provided with a seat and seatbelts which seat him in the centerplane of the airplane, his right hand being placed on the right grip of the right control wheel, his left hand being placed on the left grip of the left control wheel, and his feet being placed on the two outboard rudder pedals, thereby permitting him to control the airplane with conventional motions. He leans sideward and/or diagonally forward to the right or left windows and/or elbow rests, banking and/or pitching the airplane while scanning the view, traffic and weather. Thus from the vantage point of the centerplane seat, the SOLO pilot can execute in less than a minute a prescribed routine of 0 percent BLIND maneuvers characteristic of his airplane type, whether it has the pilot seated ahead of, under, or over, the wing. This performance contrasts with a conventional left seat solo pilot who flies BLIND in 45 to 70 percent of the sphere of solid angle centered at his nose.

5 Claims, 14 Drawing Figures

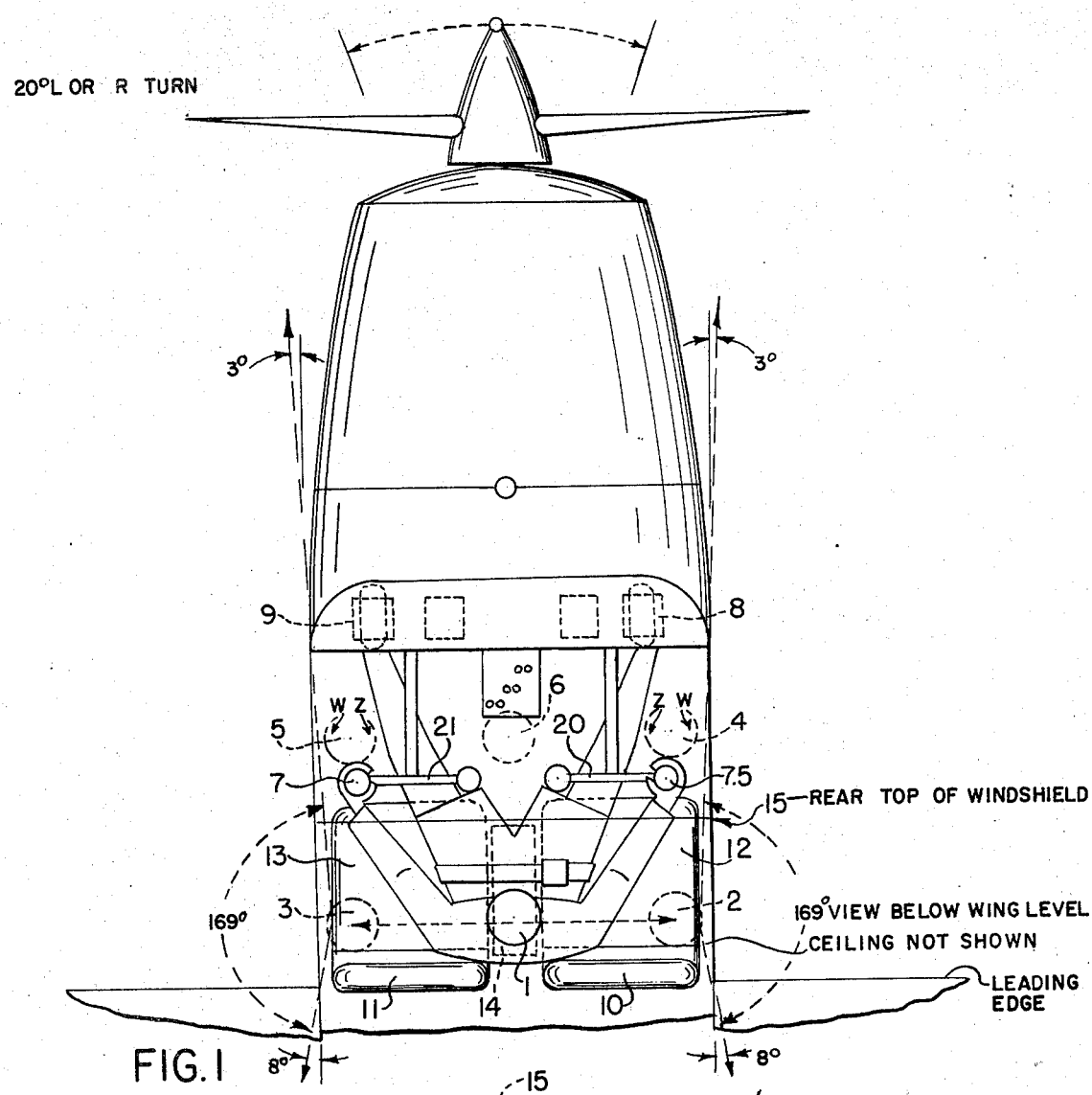
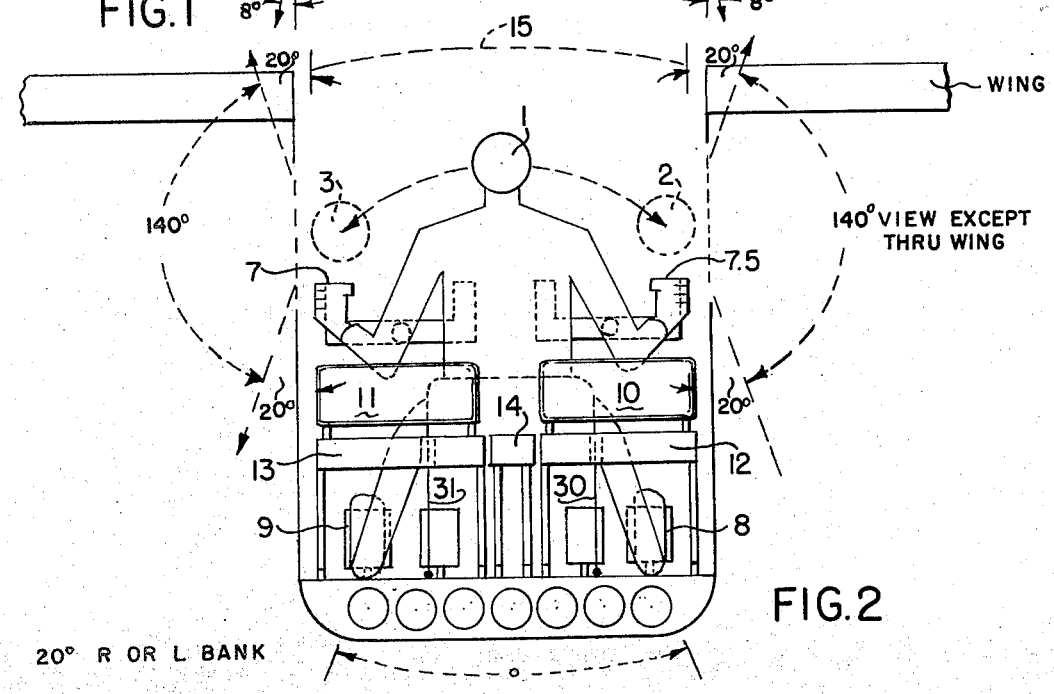

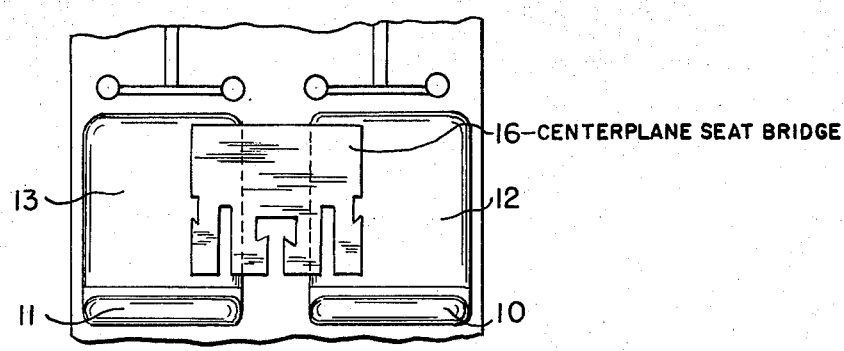
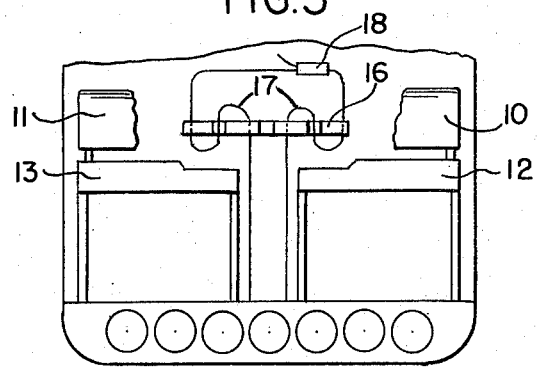
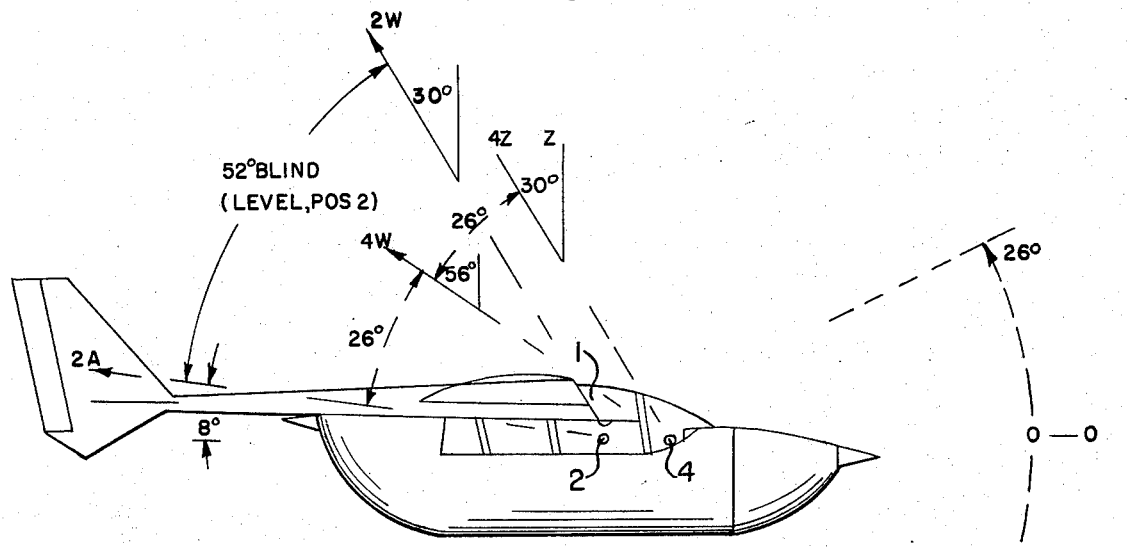
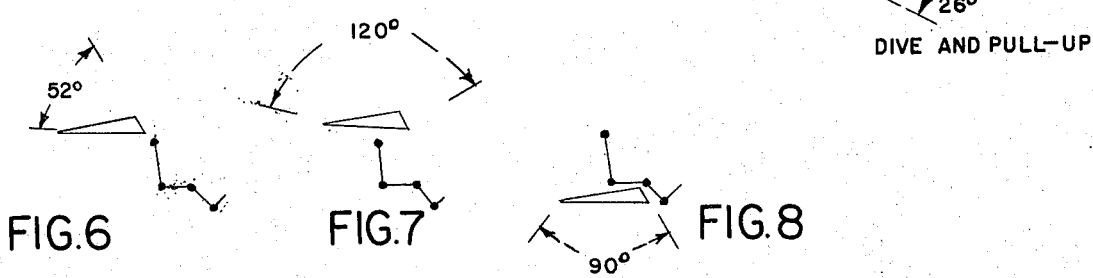

0% BLIND ROUTINE FOR CENTERPLANE PILOT AHEAD OF WING, AS FIGS. 1, 5, 6

F FORE
A AFT
U UP
S SIDE
D DOWN
Z ZENITH—AFT 30+26°
W OVER WING 55+26°

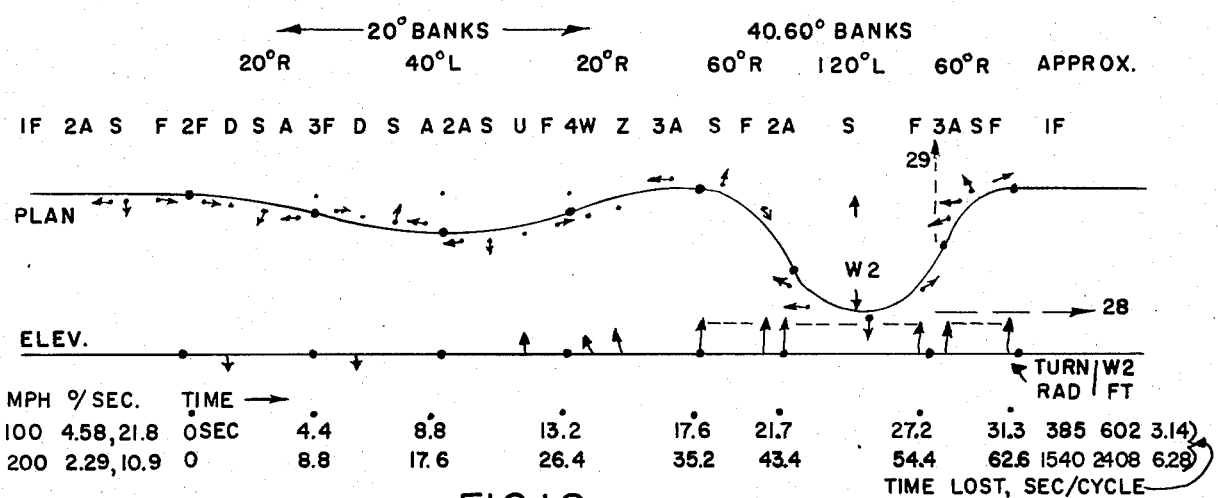
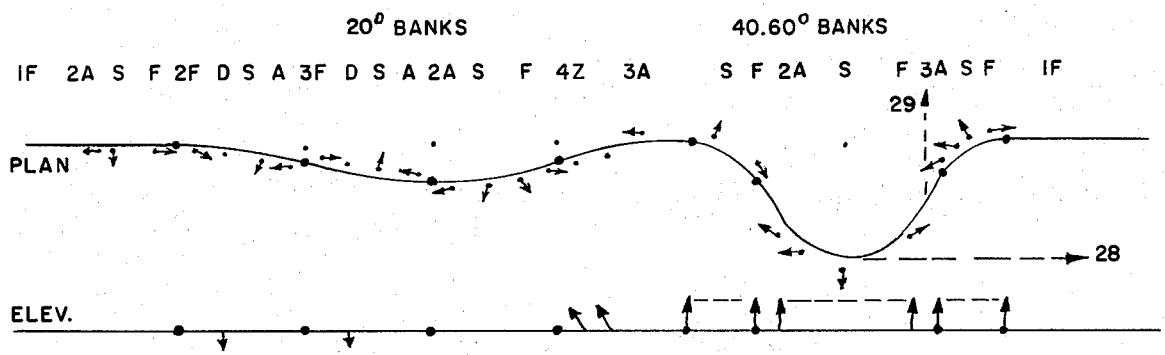
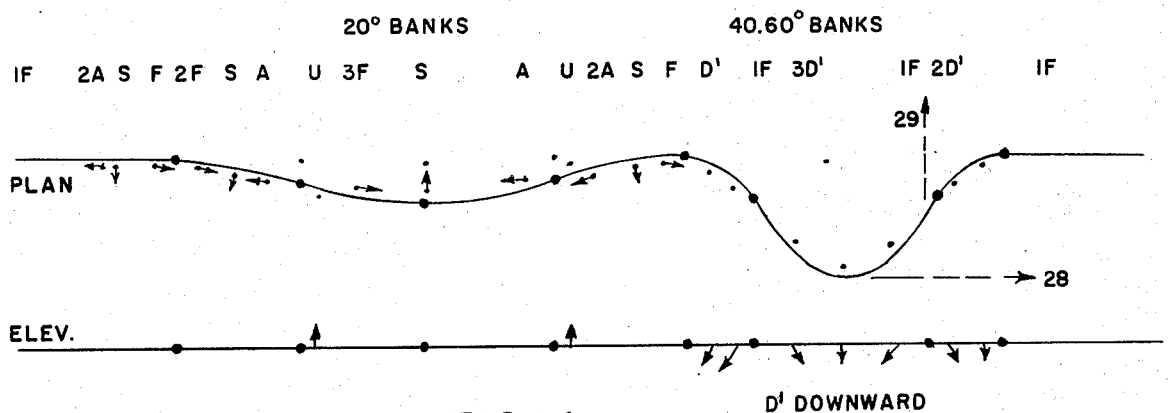

METHOD AND APPARATUS FOR THE SAFE AND BEAUTIFUL SOLO FLIGHT OF SIDE-BY-SIDE DUAL-CONTROL AIRCRAFT FROM CENTERPLANE SEAT

BACKGROUND OF THE INVENTION

1. Field of the Invention

This invention relates to improved seating apparatus for the SOLO pilot in a side-by-side dual-control airplane, and to an improved method of SOLO pilotage of said airplane to give said pilot complete field of view with 0 percent BLIND.

2. Status of the Prior Art

When a SOLO pilot flew a conventional side-by-side dual-control airplane he sat in the LEFT seat and was BLIND in 45 to 60 percent of the entire sphere of SOLID angle centered at his nose. This resulted in a continuing series of fatal midair collisions. If he tried to lean to the right window to look out the right side, he found his head on the level of the right window sill and with very little outlook. My U.S. Pat. Nos. 3,572,615 and 3,643,899 show how to construct VIEWMASTER airplanes whose pilots have exceptionally large solid angles of vision and small percentages BLIND. Until the presently constructed half BLIND airplanes have been worn out and replaced by VIEWMASTERS, they can be salvaged for safe SOLO flight as training requires, by being flown from a centerplane seat by the scanning methods disclosed in this patent, thereby achieving or approaching 0 percent BLIND.

SUMMARY OF THE INVENTION

Briefly, the present invention contemplates the seating of a SOLO pilot with his central plane normally coincident with the central plane of a side-by-side dual-control airplane, his hands being on the most rightward and most leftward of the four grips of the two control wheels, and his feet on the most rightward and most leftward of the four rudder pedals, so that he can control the airplane with conventional motions. In one embodiment, the centerplane seat consists of a rigid bridge across the space between the right and left seat bottoms, the two central seat belts of the airplane being attached near the center of the bridge to hold it down, while those belts extend to the top side of the right and left edges of the bridge and over the pilot's lap, to hold him down with minimum lost motion.

From a centerplane seat position, the SOLO pilot can lean sideward to the center of the right or left windows to see maximum view, traffic and weather on both sides; or can lean diagonally forward to the corners of the fuselage and see out through the edges or up-back through the top, of the windshield.

By combining these leaning motions with the proper phase and routines of a 20° RL bank, 20° RL turn, and 26° dive pull-up, the SOLO pilot of a Cessna 336 or 337, for example, can intermittently see in ALL directions, being effectively 0 percent BLIND. Since those required angles of maneuver represent such small departures from the average course and pitch, the SOLO pilot can scan all directions in a minute or less, with only a few seconds loss of time toward his destination.

An object of my invention is to provide the SOLO pilot of a side-by-side dual-control airplane having pilot seats more forward than the wing, with a centerplane seat apparatus so that he can see impending collision traffic, view, or weather, in ANY direction, by leaning his body and by maneuvers of the airplane not exceeding 30° from straight and level.

A further object of my invention is to provide the SOLO centerplane pilot of a side-by-side dual-control airplane, with such method instructions as will cause him to grasp such control grips and put his feet on such rudder pedals, as will enable him to fly the airplane from the centerplane seat with the conventional motions which he has already learned in his piloting from the left seat.

A further object of my invention is to provide the SOLO pilot of a side-by-side dual-control airplane with an attachable centerplane seat apparatus which utilizes the two central seat belts already provided in said airplane, with a rigid seat bottom bridge, so that the pilot is firmly restrained from vertical motion relative to the airplane.

A further object of my invention is to provide the SOLO centerplane pilot of a side-by-side dual-control airplane with such a method routine of leaning motions inside the fuselage, and maneuvers of the airplane, as will enable him to see serially in ALL directions, or approximately all directions.

BRIEF DESCRIPTION OF THE DRAWINGS

Further objects of my invention will become evident on reading the following description and consulting the drawings in which:

FIG. 1 is a plan view of the forward portion of the interior fuselage of a side-by-side dual-control Cessna 337, for example, showing the SOLO pilot in a centerplane seat with his hands on the most rightward and most leftward grips of the two control wheels, and his feet on the most rightward and most leftward of the four rudder pedals. He can lean sideward to positions 2 or 3 to see out the right or left side windows, or lean diagonally forward to positions 4 or 5 to see out through the edges or up-back, through the windshield.

FIG. 2 is an elevation of the same airplane looking forward from behind the pilot. His feet are on the most rightward and most leftward rudder pedals 8 and 9.

FIG. 3 is the plan view of an apparatus constituting an attachable centerplane seat bottom 16 for bridging the space between the two dual control seat bottoms 12 and 13 and upon which the centerplane SOLO pilot can sit.

FIG. 4 is an exploded elevation of FIG. 3 showing how to thread the two central seat belts 17 provided conventionally with the side-by-side dual-control airplane, through the attachable centerplane seat bottom 16 of FIG. 3, so that it shall hold the SOLO centerplane pilot securely from vertical motion under negative g condition.

FIG. 5 is a side view of a Cessna 337, for example, showing the SOLO centerplane pilot's normal head position 1, right side leaning position 2, and right forward leaning position 4, with the remaining 52° BLIND region, which can be seen by a 26° dive and 26° pull-up.

FIGS. 6, 7 and 8 show the positions of the SOLO pilot relative to the wing, in airplanes which respectively seat the pilot ahead of, under, or over, the wing, in each of which cases the two planes defined by the pilot's head and the leading and trailing edges of the wing, subtend BLIND angles of 52°, 120° and 90° respectively. (Examples: Cessna 337, Cessna 150, and Piper 140, respectively.)

FIG. 12 shows how the centerplane pilot ahead of the wing in a Cessna 337 can fly a 0 percent BLIND routine while holding constant altitude, but making a pair of sharp turns in order to see traffic approaching from rearward-upward, and looking upward-rearward through the windshield to see any traffic approaching from above him.

FIG. 13 shows how a centerplane pilot under the wing in a Cessna 150 can approximate a 0 percent BLIND routine whle holding constant altitude, by making a pair of sharp turns in order to see any traffic approaching from rearward-upward, and looking upward-rearward through the windshield to see any traffic approaching from above.

FIG. 14 shows how a centerplane pilot above the wing in a Piper 140 can approximate a 0 percent BLIND routine while holding constant altitude, by making a pair of sharp turns in order to see most of the traffic approaching from below him.

DESCRIPTION OF THE INVENTION

Figure 9:
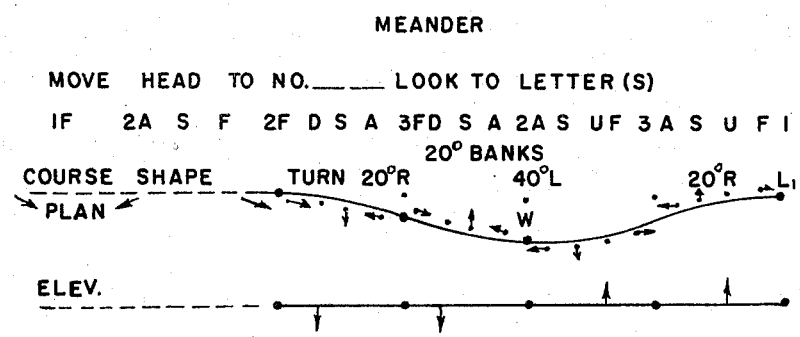
FIG. 9 shows the PLAN and ELEVation of the COURSE of a Cessna 337 flown in a single meander method with 20° banks, and turns departing 20° from straight ahead, the PILOT MOTIONS specifying the accompanying head positions for the centerplane pilot to lean to, and the directions in which he should look, in order to achieve a fast scan of ALL surrounding space EXCEPT that occulted by the wing roots.

As shown in FIGS. 1 and 2, a side-by-side dual-control airplane conventionally includes two pilots' seats side-by-side having bottoms 12 and 13 and backs 10 and 11, each seat having in front of it a control wheel such as 20 and 21 and a pair of rudder pedals such as the individual pedals 8 and 9.

When flown SOLO, it has been conventional practice for the single pilot to occupy the left seat of this pair of seats, with his hands on the two grips of the left control wheel and his feet on the left pair of rudder pedals. This SOLO pilot is BLIND in 45 percent (for Cessna 337) to 60 percent (for Cessna 150) of the sphere of SOLID angle surrounding his airplane, due to the opaque portions of his airplane such as engine cowl, panel of instruments, sidewalls, floor, ceiling, rear wall, booms and wings. This leaves much earth and sky unseen by the pilot and ample opportunity for unforseeable impending collisions to approach either from earth and sky. In a traffic pattern or other condition where most traffic is going in the same direction, his probability of collision would be only roughly doubled if he flew with hie eyes shut. If the approaching plane is also being flown SOLO, it often happens that neither pilot can see the other, their BLIND solid angles overlapping. This BLINDNESS due to the opaque portions of each airplane, is one of the causes of the approximately 36 midair collisions per year with roughly 70 lives lost per year.

My invention consists of apparatus and method for the SOLO flight of a side-by-side dual-control airplane from a CENTERPLANE seat, in which as shown in FIGS. 1 and 2, the SOLO pilot 1 is seated with the central plane of symmetry of his hips (and his body also when sitting erect) coincident with the central plane of symmetry of the side-by-side dual-control airplane, that is, he is normally seated in the center of the airplane even though it is side-by-side dual-control.

In order that his motions in controlling the airplane from the CENTERPLANE seat shall be approximately the motions which he has already learned when flying half BLIND in the left seat, he is instructed to place his right hand on the right grip 7.5 of the right control wheel 20, to place his left hand on the left grip 7 of the left control wheel 21, and to place his feet on the most rightward 8 and most leftward 9 of the four rudder pedals. The two control wheels then operate like a single large control wheel, and the rudder pedals operate conventionally.

The space between the two seats in a side-by-side dual-control airplane is conventionally of width as small as an inch in some plane types, though it is several inches wide in those types where the pilot enters by walking in from the rear. An adjustable upholstered seat bottom 14 mounted on floor tracks may be placed in this space for the comfort of the CENTERPLANE pilot. Alternatively, the space may be bridged by an attachable rigid plate 16 of FIGS. 3 and 4 which rests on the upholstered seat bottoms 12 and 13 and which may be covered with upholstery (not shown).

The seat belts in the form conventionally supplied in a side-by-side dual-control airplane are not very satisfactory for the use of a SOLO CENTERPLANE pilot. If he either clasps the two outside belts, or the two inside belts, over his lap, the belts approach his legs at angles so far from vertical that he leaves contact with the seat under negative $g$ condition and may bump his head on the ceiling. FIG. 2 therefore shows special seat belts 30 and 31 which are approximately vertical and pass through holes in the seat bottoms 12 and 13 to go vertically to the pilot's legs and hold him firmly against the seats.

Alternatively, FIG. 3 shows a pattern of slots cut into the attachable centerplane seat bridge 16 which permits the two conventional central seat belts 17 in FIG. 4 to be threaded through the slots as shown and held by friction, so that the belts beneath the bridge being approximately vertical hold the bridge firmly down against seat bottoms 12 and 13, and the outer ends of those belts passing approximately vertically upward from the edges of the bridge then pass over the pilot's lap to hold him firmly down against the bridge. In case of emergency, this seat belt may be unbuckled, quickly slipped out of the slots in the bridge while the pilot rests his weight on seat backs 10 and 11, the bridge is pulled sideward, and his legs are withdrawn rearward through the space between the seat bottoms 12 and 13.

While the CENTERPLANE pilot sits upright relative to an airplane in any attitude, he is at any instant about 48% BLIND (for Cessna 337) though his view is now equally divided between right and left sides. An advantage of the CENTERPLANE seat position rests is the ability of the CENTERPLANE pilot to lean his head to the center of the right or left side windows as shown at 2 or 3 in FIGS. 1 and 2, optionally resting his elbow on an elbow rest. He now sees out EITHER side and from about 20° of straight down to about 20° of straight up, as shown in FIG. 2, except where a wing interferes. The leading edge of the wing is rearward of the pilot on the Cessna 337 as shown in FIG. 1. He also sees within about 3° of forward and 8° of backward, as shown in FIG. 1. By means of this sideward leaning the CENTERPLANE pilot can reduce his BLINDNESS to about 25 percent of the entire sphere of SOLID angle surrounding his airplane even where it is level.

Figure 10:
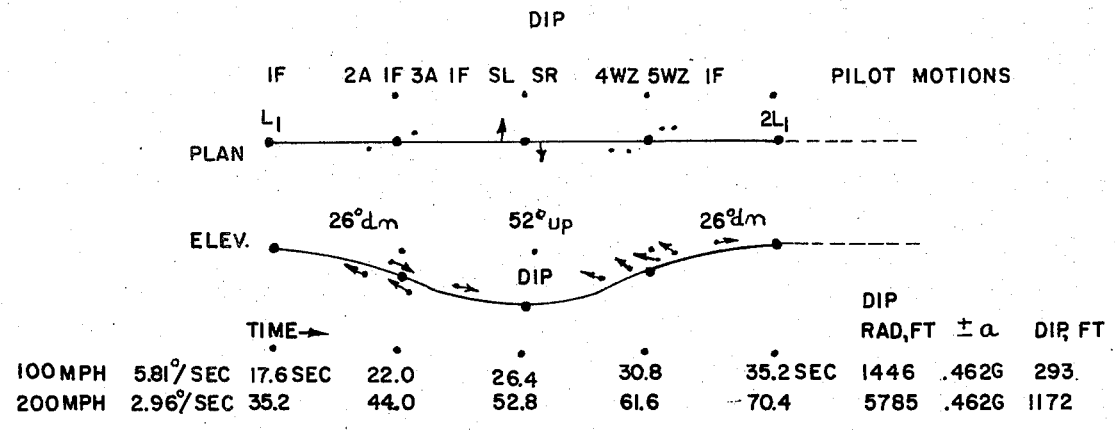
FIG. 10 is a continuation of FIG. 9 showing the PLAN and ELEVation of the COURSE for a single dip and pull-up of 26° from level, the PILOT MOTIONS specifying the accompanying head positions for the centerplane pilot to lean to, and the directions in which he should look, in order to achieve the remaining scan through the wings. At 100 mph, FIGS. 9 and 10 can be executed serially in 35.2 seconds; at 200 mph, in 70.4 seconds.

His BLINDNESS can be further reduced to about 14 percent of the entire sphere of SOLID angle by combining his sideward leaning motions with airplane maneuvers consisting of 20° R or L banks, and R or L turns of 20° from the average COURSE, as shown in FIG. 9. His BLINDNESS can further be reduced to 0 percent of the entire sphere of SOLID angle surrounding the airplane, by a further short 26° dive forward and 26° pull-up, as shown in FIGS. 5 and 10. Thus he can see ALL directions within the approximately 35 seconds required to execute these maneuvers at 100 mph while scanning the earth and sky, and will reach his destination only 2.5 seconds later per cycle of scan, because the velocity of travel never departs far from the straight line COURSE. The pilot's LEANING is responsible for much of the increase in SOLID angle of his view, and IT does not delay the flight.

METHODS OF 0 PERCENT BLIND PILOTAGE BY A SOLO CENTERPLANE PILOT

As shown in FIGS. 9 and 10, the SOLO CENTERPLANE pilot in the side-by-side dual-control airplane with pilot seated forward of the leading edge of the wing (as in a Cessna 337 or FIG. 6), can see serially in ALL directions by executing one gentle MEANDER with 20° banks and 20° R 40 ° L 20° R turns, followed by one gentle DIP of 26° nose-down, 26° nose-up, return to level, and correlated with leaning and looking PILOT MOTIONS as shown in those FIGS. One complete cycle of this method routine requires 35.2 sec at 100 mph or 70.4 sec at 200 mph. It results in a MEANDER of width 225 feet and a DIP of 293 feet, at 100 mph, or a MEANDER of width 901 feet and DIP of 1172 feet, at 200 mph (with vertical $a = \pm 0.462g$ at both speeds).

In FIGS. 9 and 10 the PLAN and ELEVation of the COURSE is plotted versus scales of time in sec for speeds of either 100 or 200 mph. Above the PLAN and versus the same time scales, there is plotted the method steps of centerplane PILOT MOTIONS in leaning and looking, his designated HEAD POSITIONS 1 (center), 2 (right), 3 (left(, 4 (right-forward), and 5 (left-forward), being as defined in FIG. 1, and the succeeding DIRECTIONS of LOOKING from those positions being shown by the capital letters — Fore, Aft, Up, Side, Down, D'ownward, Zenith-aft, over-Wing, which follow any head position numeral. The approximate HEAD POSITIONS are also shown relative to the center of the fuselage by dots alongside the course PLAN, said dots having arrows to indicate the succeeding DIRECTIONS of LOOKING. Arrows alongside the ELEVation indicate where the view is Down, D'ownward, or Up.

Thus in FIG. 9, the SOLO CENTERPLANE pilot in the side-by-side dual-control Cessna 337, in the countdown to time 0, prepares for a right turn by clearing traffic from the right side by PILOT MOTIONS starting at 1F (center looking Fore), then 2A S F (leaning right looking Aft, Side Fore). Now at time 0 he makes a 20° R bank starting a 20° R turn during which the PILOT MOTIONS are 2 F D S A, namely still leaning right but looking successively Fore Down Side Aft. (FIG. 2 shows that with a 20° R bank and PILOT MOTIONS 2 D S, he sees from straight Down through the R Side horizon to within 40° of the zenith.) At time 4.4 sec (at 100 mph) he makes a 20° L bank starting a 40° L turn with PILOT MOTIONS 3 F D S A 2 A S U F. The MEANDER is completed following 13.2 sec by a 20° R bank and 20° R turn with PILOT MOTIONS 2 A S U F.

Note that in the first two quarters of the MEANDER, the pilot has his head adjacent to the windows on the inside of the turns so he can see straight Down and Sideward on both sides, while in the last two quarters of the MEANDER he has his head adjacent to the windows on the outside of the turns so he can see straight Up and Sideward on both sides, as shown in FIG. 2. Thus he sees in all directions around his fuselage EXCEPT where the wings interfere with his view rearward-upward through a vertical angle of 52° as shown in FIG. 5.

One way to eliminate that remaining BLIND region is to follow the MEANDER by a 26° DIP as shown in FIG. 10. The MEANDER has already assured the pilot that the space below him is clear of traffic and that a DIP will be safe. In PLAN the course is now straight but in ELEVation it now consists of a circular dive to a nose-down pitch of 52/2 = 26°, followed by a 52° pull-up to a 26° nose-up pitch, followed by a 26° circular level-off to the initial altitude. These three maneuvers are chosen to be executed in the same total time as a MEANDER (17.6 sec at 100 mph or 35.2 sec at 200 mph) thereby resulting in vertical accelerations of ± 0.462g throughout at either 100 or 200 mph. The total DIP is 293 feet at 100 mph or 1172 feet at 200 mph.

The PILOT MOTIONS in the first half of the DIP, the nose-down portion from time 17.6 sec to 26.4 sec (at 100 mph), are 1 F 2 A 1 F 3 A 1 F $S_L$, which is principally 1 F (sitting in the center looking Fore-downward over the lowered nose), but near the time when the nose is 26° down, a quick glance 2 A is made Aft under the right wing up to 8°+26° above the rear horizon (to 4W in FIG. 5), and a quick glance 3 A made Aft under the left wing up to 8°+26° above the rear horizon.

The PILOT MOTIONS in the last half of the DIP, the nose-up portion from time 26.4 sec to 35.2 sec (at 100 mph), are $S_R$ 4WZ 5WZ 1F. Sitting in the center with nose approximately level near the bottom of the DIP, the horizon is scanned rightward from $S_L$ through $S_R$. As shown in FIG. 5, with the pilot's head at 2 near the center of the R window, he can see back over the leading edge of the R wing to a plane which slopes back 30° behind the zenith as shown at 2W, but if the pilot moves his head forward to position 4, he can see still farther back over the leading edge of the R wing to a plane which slopes back 56° behind the zenith as shown at 4W; further pulling the plane's nose up 26° extends his vision over the R wing to within 8° of the rear horizon. Still from head position 4, but looking leftward and upward through the top of the windshield, he sees 30° rear of the zenith with level ship, and 56° rear of the zenith (at 4W) with the plane's nose up 26°. Similarly for the PILOT MOTIONS 5WZ executed from a left-forward head position and plane's nose up (not shown in FIG. 5). Thus the unusual PILOT MOTIONS 4WZ5WZ executed with plane's nose up, result in the four Aft-upward view arrows along the ELEVation near time 30.8 (at 100 mph), and which in conjunction with the Aft-downward arrows near nose-down time 22.0 sec give complete view Aft.

Figure 11:
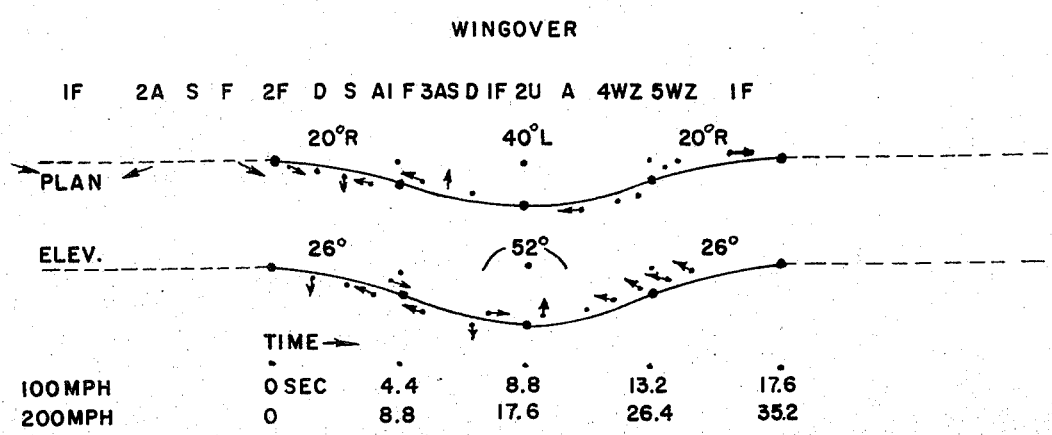
FIG. 11 shows how to execute FIGS. 9 and 10 SIMULTANEOUSLY as a gentle wingover enabling the centerplane pilot to scan the ENTIRE sphere at 100 mph in 17.6 seconds, being 0 percent BLIND.

In FIG. 11 the MEANDER and the DIP are executed at the same time so that the whole 0 percent BLIND maneuver, which may now be described as a gentle WINGOVER, is executed in 17.6 sec (at 100 mph). The specified PILOT MOTIONS from 0 sec are — 2F D S A1F3ASD1F2U A 4WZ5WZ 1F. Thus again during the nose-down time there are the Aft-upward glances 2 A 3 A, and during the nose-up time the motions 4WZ5WZ, which together result in complete view Aft, in addition to the other views.

If under the navigation conditions, the changes of altitude of a DIP are not permissible, an approximately 0 percent BLIND routine at fixed altitude can be executed by the CENTERPLANE pilot in the Cessna 337 or other airplane with pilot ahead of the wing like FIG. 6, by following the steps shown in FIG. 12. This consits of a gentle MEANDER with 20° banks and 20° R 40° L 20° R turns, followed by a sharp MEANDER with banks of 40° to 60° R 120° L 60° R turns. This sharp MEANDER deviates from the straight COURSE by a width $w_2$ of 602 feet at 100 mph, or 2408 feet at 200 mph. The two MEANDERS delay the arrival time by 3.14 sec at 100 mph or 6.28 sec at 200 mph.

The PILOT MOTIONS for the first three quarters of the gentle MEANDER of FIG. 12 are the same as already explained under FIG. 9, but for the fourth quarter the PILOT MOTIONS in the 20° R bank and 20° R turn are 4W Z 3A which yield a considerable view Aft-upward. At time 17.6 (at 100 mph) he starts the sharp MEANDER, tightening the bank to 40° or 60°, and extending the turn to about 60° R, during which the PILOT MOTIONS 3A S F give a good view leftward-upward under the high wing. Now a short level stretch in which the pilot gets set in position 2A in preparation for his best view Aft across the rear course just as the sharp bank of 40° to 60° L is made in starting the 120° L turn at 21.7 sec (at 100 mph). That good view Aft lasts only 2 or 3 seconds. The PILOT MOTIONS during the 120° L turn are 2A S F. Now at the start of the final sharp turn of 60° R, the pilot again gets into position 3A and sees an equally good view Aft across the rear course from the left side. During this final turn the PILOT MOTIONS are 3 A S F. Thus a short-time good view Aft follows the beginning of a sharp bank L (or R) which follows a sharp turn R (or L) away from the COURSE.

If time is precious, the sharp MEANDER may be terminated at its most rightward point along the offset course 28 in FIG. 12. Or if the pilot is flying a rectangular L traffic pattern, he may use a tight MEANDER to achieve a 90° L turn by terminating the sharp MEANDER to the left, as shown at 29. If the pilot is sitting under the wing as in FIG. 7 (example Cessna 150), FIG. 13 shows how he can again use a gentle MEANDER followed by a steep MEANDER to achieve an approximately 0 percent BLIND routine including a considerable view upward. The first half of the gentle MEANDER is executed with PILOT MOTIONS as shown in FIG. 9 and gives a complete view Downward. The third quarter omits the look Upward and has PILOT MOTIONS 2A S F. The fourth quarter has PILOT MOTIONS 4Z 3A, a considerable view upward behind the Zenith being obtained from position 4 by looking through the top of the windshield. The sharp MEANDER has the same shape and PILOT MOTIONS as explained above with reference to FIG. 12 and yields good views Aft and upward.

If the pilot is sitting above the wing as in FIG. 8 (example Piper 140), FIG. 14 shows how he can also use a gentle MEANDER followed by a sharp MEANDER to achieve an approximately 0 percent BLIND routine including a considerable view downward. The first two quarters of the gentle MEANDER have PILOT MOTIONS 2F S A U 3F, the change to the 20 L bank in the second quarter being made with the pilot's head still in position 2 so he is on the outside of the turn and can look straight Up. The change to position 3 is made later in the second quarter. The third quarter has PILOT MOTIONS (3)S A. Fourth quarter has (3)U 2A S F, giving a view Upward on the other side. (Note that because of the good views Upward out of the side windows, it is not necessary for the pilot of the Piper 140 to use a MOTION 4Z looking through the top of the windshield.) The pilot of the Piper 140 never sees straight Down since his banks without parachutes are limited to 60°, but the 60° banks of the sharp MEANDER do give him a very considerable view D'ownward. Throughout the sharp MEANDER the pilot rides on the inside of the turns to get his best view D'ownward, and rides in the center in the short straight portions. The PILOT MOTIONS for his entire sharp MEANDER are therefore

| [2]D' | 1F3D' | 1F2D' | 1F. |
|---|---|---|---|

In either FIGS. 13 or 14, the sharp MEANDER may be terminated early along exit courses 28 or 29 as explained above with reference to FIG. 12.

TRAINING

A student pilot should take his early dual training in the Left seat where he will finally sit when flying with a copilot or passenger in the Right seat to assist him in locating approaching traffic. But the student's later dual training will be taken in the CENTERPLANE seat and I find that there is still room for the instructor on his Right, who will then teach him the details of an approximately 0 percent BLIND routine for that type of airplane. When the student is ready to SOLO, the law should REQUIRE him to fly from the CENTERPLANE seat only, while he practices landings and 0 percent BLIND routines.

The law should not permit anyone to fly Left seat SOLO VFR half BLIND at any time. Two thirds of the collisions occur within 5 miles of an airport, where the traffic is mostly one-way and all airplanes are changing altitudes and unable to see where they are going due to their opaque instrument panels etc. Traffic therefore appears to approach from above or below as well as right or left and the SOLO pilot of a conventional airplane must fly an approximately 0 percent BLIND routine fairly often to avoid running into or being run into by other airplanes. Otherwise, flight by "see and be seen" technique is foolhardy.

DEFINITIONS

A "side-by-side dual-control airplane" is an airplane which has two pilot seats equally far forward and beside each other, there being a control wheel and a pair of rudder pedals in front of each of said two pilot seats.

A "centerplane" seat is a means for seating a SOLO pilot with the midplane of his hips in the fore-aft vertical central plane of symmetry of the airplane. When the dual pilot seats are symmetrically placed relative to said fore-aft vertical central plane of symmetry of the airplane, a centerplane seat is equivalent to a means for seating the SOLO pilot midway laterally between the dual pilot seats.

A "gentle meander" is a maneuver of the airplane with banks less than 30° comprising: a first turn from the course less than 30°, a second turn in the opposite direction and of twice the angle of the first turn, and a third turn of the same direction and amount as the first turn (back to the original course).

A "sharp meander" is a maneuver of the airplane with banks between 40° and 60° comprising: a first turn from the course of 40° to 60°, a second turn in the opposite direction and of twice the angle of the first turn, and a third turn of the same direction and amount as the first turn.

A "dip" is a maneuver of the airplane comprising: a dive to a nose-down position of less than 30° from level, a pull-up to a nose-up position of less than 30° from level, and a return to level.

What I claim is:

1. In a side-by-side dual control airplane apparatus for seating a solo pilot mid-way laterally between the dual pilot seats comprising,
   a plate supported by the two dual seat bottoms and constituting a bridge between the bottoms upon which the SOLO pilot sits mid-way between said dual pilot seats,
   said bridge plate having at least one central slot and two outboard slots therein,
   the central seat belts of the airplane which are run from the floor in vertical fore-aft planes and attached to said bridge plate by being threaded up through said central slot, said belts then being threaded down through respective outboard slots and back up around said bridge plate to restrain it from vertical motion relative to the airplane, and
   a seat belt run across the lap of the SOLO pilot downward alongside his legs in fore-aft vertical planes and attached to said plate to restrain the SOLO pilot from vertical motion relative to said plate.

2. In a side-by-side control airplane, a method of reducing the percentage Blind of a SOLO pilot comprising the steps of:
   seating the SOLO pilot mid-way laterally between the dual pilot seats of the airplane,
   restraining said SOLO pilot from vertical motion relative to the airplane while permitting him freedom to lean to a right and to a left window of the airplane,
   placing said pilot's right hand on the right grip of the right control wheel,
   placing said pilot's left hand in the left grip of the left control wheel, placing said pilot's right foot on the most rightward rudder pedal, placing said pilot's left foot on the most leftward rudder pedal, and operating the airplane by the SOLO pilot by manipulating the control wheels and the rudder pedals with the hands and the feet of the pilot on the respective control wheels and rudder pedals as aforesaid by utilizing substantially the same control motions of his hands and feet that he would use for those same maneuvers in left seat SOLO flight, and while leaning to the side windows of the airplane.

3. In a side-by-side dual-control airplane,
   a method for reducing the percentage BLIND of a SOLO pilot, comprising the steps of:
   seating the SOLO pilot midway laterally between the dual pilot seats of the airplane,
   restraining said SOLO pilot from vertical motion relative to the airplane while permitting him freedom to lean to a right and to a left window of the airplane,
   placing said pilot's right hand on the right grip of the right control wheel,
   placing said pilot's left hand on the left grip of the left control wheel,
   placing said pilot's right foot on the most rightward rudder pedal,
   placing said pilot's left foot on the most leftward rudder pedal,
   flying a gentle meander maneuver of the airplane and said pilot leaning to the right and left windows of the airplane.

4. A method as in claim 3 with the additional step of: flying a dip maneuver of the airplane.

5. A method as in claim 3 with the additional step of: flying a sharp meander maneuver of the airplane.

* * * * *